US011126485B2

(12) United States Patent
Tsirkin (10) Patent No.: US 11,126,485 B2
(45) Date of Patent: Sep. 21, 2021

(54) RISK ASSESSMENT FOR RUN-TIME PATCHES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 16/389,902

(22) Filed: Apr. 19, 2019

(65) Prior Publication Data

US 2020/0334133 A1 Oct. 22, 2020

(51) Int. Cl.
*G06F 11/00* (2006.01)
*G06F 8/656* (2018.01)
*G06F 11/30* (2006.01)

(52) U.S. Cl.
CPC ............ *G06F 11/004* (2013.01); *G06F 8/656* (2018.02); *G06F 11/3037* (2013.01); *G06F 2201/88* (2013.01)

(58) Field of Classification Search
CPC .. G06F 11/004; G06F 11/008; G06F 11/3037; G06F 11/36; G06F 11/3672; G06F 11/3688; G06F 8/60; G06F 8/65; G06F 8/656; G06F 8/70; G06Q 10/0635; G06Q 10/06375; H04L 63/1433
See application file for complete search history.

(56) References Cited

U.S. PATENT DOCUMENTS

| 5,655,074 | A  | * | 8/1997  | Rauscher ............ G06F 11/3616 |
|           |    |   |         | 702/179 |
| 7,376,945 | B1 | * | 5/2008  | Kakumani ............ G06F 9/4416 |
|           |    |   |         | 717/171 |
| 8,468,516 | B1 |   | 6/2013  | Chen et al. |
| 8,613,096 | B2 |   | 12/2013 | Peinado et al. |
| 9,164,754 | B1 |   | 10/2015 | Pohlack |
| 2003/0229890 | A1 | * | 12/2003 | Lau ........................ H04L 69/329 |
|           |    |   |         | 717/168 |
| 2006/0101450 | A1 | * | 5/2006  | Datta ........................ G06F 8/65 |
|           |    |   |         | 717/168 |
| 2006/0288341 | A1 | * | 12/2006 | Wurden .............. G06F 9/44536 |
|           |    |   |         | 717/168 |
| 2015/0154397 | A1 | * | 6/2015  | Bank ........................ G06F 21/56 |
|           |    |   |         | 726/22 |
| 2016/0259636 | A1 | * | 9/2016  | Plate ...................... G06F 11/366 |
| 2018/0157566 | A1 | * | 6/2018  | Komorida ........... G06F 11/2247 |
| 2019/0138431 | A1 | * | 5/2019  | Holbrook .................. G06F 8/65 |
| 2019/0310929 | A1 | * | 10/2019 | Wright ................ G06F 11/3608 |

OTHER PUBLICATIONS

Chen et al, "SafeStack: Automatically Patching Stack-Based Buffer Overflow Vulnerabilities," IEEE Transactions on Dependable and Secure Computing, vol. 10, No. 6, Nov./Dec. 2013, 12 pgs.

* cited by examiner

*Primary Examiner* — Gabriel Chu
(74) *Attorney, Agent, or Firm* — Lowenstein Sandler LLP (57) ABSTRACT

A risk assessment manager for run-time patches receives a run-time patch to update one or more portions of a memory space, determines a first portion of memory of the one or more portions of the memory space to be updated by the run-time patch, and monitors the first portion of the memory space to detect accesses of the first portion of memory. The risk assessment manager determines a risk assessment value for the run-time patch in view of a number of accesses of the first portion of the memory space, and executes a test process for the run-time patch in view of the risk assessment value.

19 Claims, 8 Drawing Sheets

RISK ASSESSMENT FOR RUN-TIME PATCHES

TECHNICAL FIELD

The present disclosure is generally related to computer systems, and more particularly, to risk assessment for run-time patches in computer systems.

BACKGROUND

A patch is a set of changes to a computer program or its supporting data that is designed to update it, correct it, or improve it. A patch can sometimes be used to fix security vulnerabilities (e.g., bugfixes) and/or improving the usability or performance within a system. While patches are typically intended to fix problems, poorly designed patches can sometimes introduce new problems to system environments. In some cases, patches may knowingly break the functionality or disable a device, for instance, by removing components for which the update provider is no longer licensed.

Run-time patching, also known as live patching or dynamic software updating, refers to the application of patches without shutting down and restarting the system or the program affected. This type of patching can be useful in systems where availability is critical and that cannot be routinely shut down for system maintenance, either for software upgrades or to fix defects.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for risk assessment for run-time patches. Runtime patching can assist with maintaining a running system by allowing for bug fixes, software upgrades, and temporary debugging routines to be placed into applications without stopping the system. Patching is ideal for systems that need continuous availability, and therefore, must undergo all maintenance while operating. Run-time patching reduces the need to upgrade the entire system in order to fix software defects. Additionally, run-time patching can be used to apply updates to software and in-memory data structures quickly in order to avoid exposure to critical system vulnerabilities. Run-time patching, however, can still expose systems to unanticipated downtime. In some instances, bug fixes included in run-time patches may have unexpected side effects that can be even more undesirable than the original defect, and may only be found after the patch has already been applied.

Some conventional systems mitigate these risks by incorporating advanced memory mapping techniques to limit exposure to program crashes. For example, updated code may be loaded into memory and the existing code may be modified to branch to the updated code. These types of solutions, however, can often lead to memory leaks if the existing code is not eventually removed from memory. Additionally, some patches may involve software updates that are complex and intrusive, involving multiple executable instructions and supporting data structures. Thus, in some situations, the level of risk involved in a patch can be very high but may not be fully appreciated until the patch is actually applied. Thus, the benefits of using a patching method to ensure higher system availability can actually result in lower system availability. Other conventional systems mitigate these risks by limiting run-time patching to critical system vulnerabilities, and applying most patches during system down-time. This solution, however, significantly reduces system availability.

Aspects of the present disclosure address the above noted and other deficiencies by implementing a risk assessment manager for run-time patches. When a patch is received or generated, the patch may be analyzed to identify the portions of memory that are updated by applying the patch. The risk assessment manager can then monitor these portions of memory for any access by any executing programs in the system and make an assessment of the level of risk associated with applying the changes to the environment. Thus, the level of risk associated with the changes can be assessed in terms of how often the affected memory is accessed by the patch. Thus, if a patch modifies areas of memory that are accessed often, this may present a high risk to the environment. Conversely, if the patch modifies areas of memory that are rarely accessed, this may present a low risk to the environment. For example, the risk assessment manager may keep track of the number of times the monitored memory has been accessed over a particular period of time. If the total number of accesses satisfies a threshold condition (e.g., if the total number of accesses is greater than or equal to a threshold number of accesses), the risk assessment manager may determine that the run-time patch is high risk. Once a determination has been made as to the risk of the run-time patch, the risk assessment manager can then assign and/or execute a testing process for the run-time patch by increasing or decreasing the amount of testing for the run-time patch to complete a testing stage of a software deployment process. Thus, aspects of the present disclosure can identify the areas in memory that the patch intends to update to estimate how often those areas of memory would be accessed. This, in turn, can provide an indication of the risk associated with the patch and how much testing may be needed for the intended changes.

Aspects of the present disclosure present significant advantages over conventional solutions to the issues noted above. First, the risk assessment manager provides the ability to detect which functionality is affected by a patch before exposing it to a production environment, which reduces the overall risk for business operations and provides a more efficient method of remaining up to date with vendor patches. Thus, the resulting application of run-time patches can be significantly more secure and stable. Additionally, the relative safety of applying a run-time patch can be determined well in advance, and in cases where a patch presents a low level of risk, testing can be significantly reduced, thus saving processing resources for other computing tasks. Moreover, adding systemic risk assessment to a run-time patch deployment process can significantly reduce downtime for those systems that prioritize system stability over continuous availability.

Figure 1:
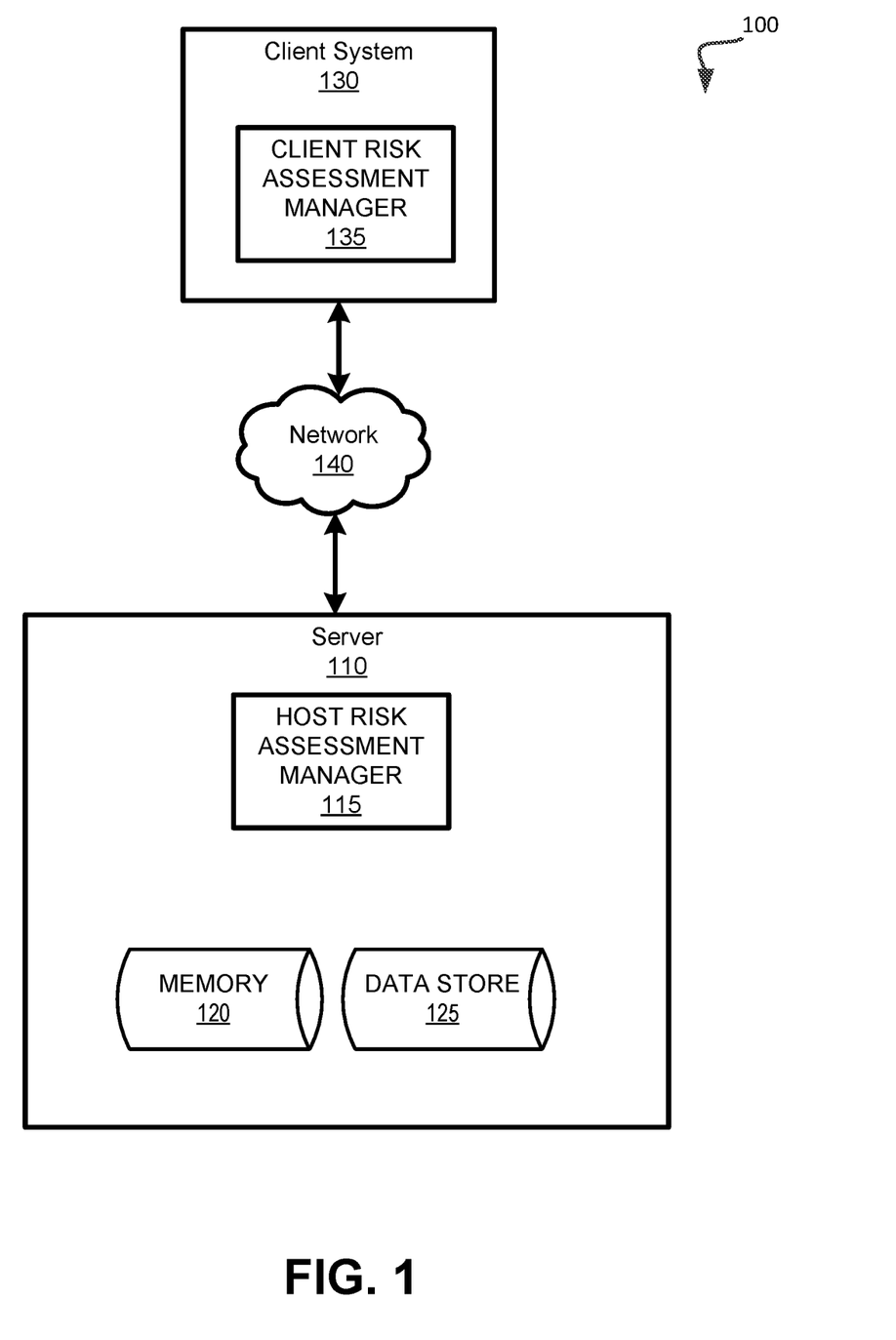
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. Other architectures for computer system 100 are possible, and implementation of a computer system utilizing examples of the present disclosure is not limited to the specific architecture depicted by FIG. 1.

As shown in FIG. 1, the computer system 100 may include a server 110 (e.g., a server system) and one or more client systems 130 capable of communicating with the server 110 via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The client systems 130 and the server 110 may include one or more processors communicatively coupled to memory devices and input/output (I/O) devices. The client systems 130 and server 110 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The server system 110 may include one or more machines (e.g., one or more server computer systems, routers, gateways, etc.). In some implementations, the server system 110 can include one or more cloud based servers (such as server systems made accessible to network connectivity via the internet or wireless carrier systems), which may be hosted, for example, by cloud based hosting services.

Server system 110 may include a memory 120, and a data store 125. The data store 125 may share the physical hardware with the server system 110 (one or more hard disk drives, solid-state drives, etc. within the server hardware) or be an independent device coupled to the server system directly or via a network (e.g., as a network-attached storage device (NAS)). Memory 120 may comprise volatile memory devices (e.g., random access memory (RAM)), non-volatile memory devices (e.g., flash memory) and/or other types of memory devices. Memory 120 can include areas that are to be updated by run-time patches such as executable code, in-memory data structures, areas of the memory heap, areas of the memory stack, or the like. Memory 120 can also include memory management structures such as page tables and debugging registers.

Server system 110 may also include a host risk assessment manager 115 that implements risk assessment for run-time patches. Host risk assessment manager 115 can analyze a run-time patch to identify the portions of memory 120 that will be updated by applying the patch.

Host risk assessment manager 115 can then monitor these portions of memory for any access by any executing programs and make an assessment of the level of risk associated with applying the run-time patch to the environment. For example, host risk assessment manager 115 may keep track of the number of times the monitored memory has been accessed over a particular period of time. If the total number of accesses satisfies a threshold condition, host risk assessment manager 115 may determine that the run-time patch is high risk. Once a determination has been made as to the risk of the run-time patch, host risk assessment manager 115 can then assign and/or execute a testing process for the run-time patch associated with its level of risk. This can be accomplished by increasing or decreasing the amount of testing for the run-time patch to complete a testing stage of a software deployment process, assigning particular test cases, sending a notification to an interested party regarding the level of risk, or the like. Host risk assessment manager 115 is described in further detail below with respect to FIG. 2.

Client system 130 may include a client risk assessment manger 135. In some implementations, client risk assessment manager 135 may communicate with host risk assessment manager 115 to determine the level of risk associated with applying a run-time patch, as well as managing any changes to testing protocol as a result of the risk assessment. In an illustrative example, client risk assessment manager 135 may be a component of (or invoked by) a debugging application or user interface executed by client 130. In such cases, client risk assessment manager 135 can receive or detect a run-time patch, determine the portions of memory updated by the patch, and send a request to the host risk assessment manager 115 to protect the applicable portions of memory. Host risk assessment manager 115, upon receiving the request, can monitor these portions of memory using one of several memory protection techniques. Subsequently, host risk assessment manager 115 can return information to the client risk assessment manager 135 to be used to make a risk assessment determination. The client risk assessment manager can receive this information, determine the risk assessment for the patch, and provide the risk assessment to the user interface of the client system 130. Client risk assessment manager 135 and its communications with host risk assessment manager 115 are described in further detail below with respect to FIGS. 3-4.

Figure 2:
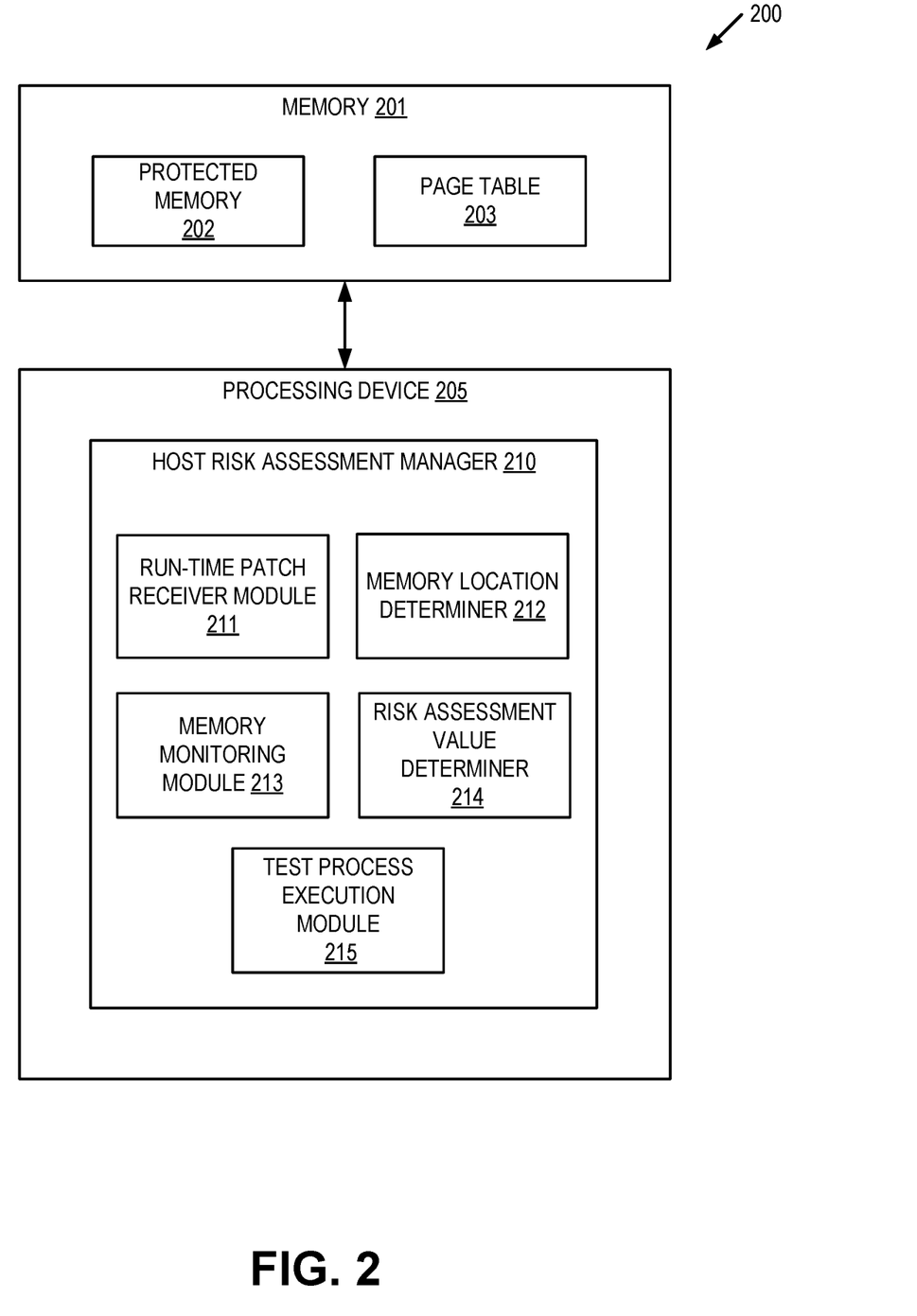
FIG. 2 depicts a block diagram illustrating an example of a host risk assessment manager, in accordance with one or more aspects of the present disclosure.

FIG. 2 depicts a block diagram illustrating an example of a host risk assessment manager 210 for facilitating risk assessment of run-time patches. In some implementations, host risk assessment manager 210 may correspond to host risk assessment manager 115 of FIG. 1. As shown in FIG. 2, host risk assessment manager 210 may be a component of a computing apparatus 200 that includes a processing device 205, operatively coupled to a memory 201, to execute host risk assessment manager 210. In some implementations, processing device 205 and memory 201 may correspond to processing device 502 and main memory 504 respectively as described below with respect to FIG. 8.

Host risk assessment manager 210 may include run-time patch receiver module 211, memory location determiner 212, memory monitoring module 213, risk assessment value determiner 214, and test process execution module 215. Alternatively, the functionality of one or more of run-time patch receiver module 211, memory location determiner 212, memory monitoring module 213, risk assessment value determiner 214, and test process execution module 215 may be combined into a single module or divided into multiple sub-modules.

Run-time patch receiver module 211 is responsible for receiving a run-time patch to update one or more portions of a memory space. For example, the run-time patch can include updates to executable instructions, in-memory data structures, register values, memory heap data, memory stack data, or the like. Run-time patch receiver module 211 can receive the patch from an external system (e.g., a connected vendor system), a connected client system (e.g., client system 130 of FIG. 1), from a component that generates the patch within the server system executing host risk assessment manager 210 (e.g., server 110 of FIG. 1), or from any similar source.

Memory location determiner 212 is responsible for analyzing the run-time patch and determining the portions of the memory space updated by the run-time patch. The run-time patch may include a list of memory locations updated by the patch in associated metadata. Memory location determiner 212 can analyze this associated data and determine the memory locations that are to be updated by the patch. For example, memory location determiner 212 can determine the address associated with an executable instruction to be updated, the address associated with a data structure to be updated, an address associated with a register value to be updated, or the like. Once the particular memory locations that are to be updated by the patch have been identified, host risk assessment manager 210 can begin monitoring one or more of those memory locations to determine the risk of implementing the run-time patch.

Memory monitoring module 213 is responsible for monitoring the identified portions of memory that are to be updated by the run-time patch to determine when those portions of memory are accessed. In some implementations, all of the memory locations updated by the run-time patch can be monitored. Alternatively, a subset of the memory locations can be monitored. Memory monitoring module 213 can monitor the identified portions of memory by protecting the memory and detecting accesses of the protected memory.

In some implementations, memory monitoring module 213 can monitor the memory locations using protected memory pages. For example, memory monitoring module 213 may first determine an address of a memory page associated with a portion of memory updated by the run-time patch. Memory monitoring module 213 may then identify an entry in a memory page table (e.g., page table 203) associated with the determined address of the memory page and modify that page table entry to protect the associated memory page. Thus, any subsequent access of the monitored memory location that is located within that protected page of memory (e.g., protected memory 202) can trigger a page fault to provide a notification of the access. For example, if the monitored memory location is associated with an executable instruction of a program, when that instruction is executed by an invocation of the program, a page fault may be triggered. Similarly, if the monitored memory location is associated with a data structure or register, if any program or process accesses that memory location, a page fault may then be triggered.

If a page fault is triggered, memory monitoring module 213 can detect the page fault generated by the access and log the access. In some implementations, memory monitoring module 213 can log the access by increasing a counter associated with the number of accesses that is stored in memory, a data store, or in any similar manner.

In some implementations, memory monitoring module 213 can monitor the memory locations using breakpoint or debugging registers. Some CPUs and operating systems provide special registers that can be used to set breakpoints in executable code for use with debugging. For example, on the Intel® x86 architecture, there are six debug registers, named DR0 . . . DR7. These debug registers allow programmers to selectively enable various debugging conditions associated with a set of debug addresses.

In such instances, memory monitoring module 213 can identify a register for debugging an executing program, and configure that register to halt execution of the program when the program accesses the portion of memory being monitored (e.g., if the program attempts to execute an instruction that the patch will update). Memory monitoring module 213 can then detect an access of the monitored memory portion (e.g., protected memory 202) when the configured debug register causes the executing program to halt. Memory monitoring module 213 can then log the access as described above. Once the access has been logged (e.g., a counter incremented, the logging data stored, etc.), the execution of the program may be resumed.

In some implementations, memory monitoring module 213 can monitor the memory locations of an executable instruction by utilizing a software implementation of a debug register. In such instances, memory monitoring module 213 can temporarily patch the instruction included in the monitored portion of memory (e.g., protected memory 202) and replace it with a "STOP" instruction. The memory that holds the code can be modified with this special instruction that stops the CPU. Execution can then jump to another instruction that is configured to report that an attempt was made to execute the instruction at the address being monitored.

In particular, memory monitoring module 213 can identify the program instruction associated with the portion of the memory space being monitored, and modify that portion of memory to replace the program instruction with a second instruction to halt execution of the program when the program accesses the monitored program instruction. Subsequently, memory monitoring module 213 can detect that the second instruction (e.g., the "STOP" instruction) has been accessed by the program and log the access as described above. Once the access has been logged (e.g., a counter incremented, the logging data stored, etc.), the execution of the program may be resumed.

In some implementations, memory monitoring module 213 may implement any of the above memory monitoring techniques for a particular period of time. For example, memory monitoring module 213 may keep track of the time that monitoring the memory associated with the run-time patch began as well as the duration of the monitoring session and any accesses that occurred during that time. Memory monitoring module 213 may continue monitoring the identified memory locations for a specific period of time (e.g., a number of minutes, hours, days, etc.), and calculate a total number of accesses at the end of the time period. Alternatively, memory monitoring module 213 may receive in instruction to begin monitoring until it receives a second instruction to terminate monitoring, at which time it can return the total number of accesses of the monitored memory location.

Risk assessment value determiner 214 is responsible for determining the risk associated with the run-time patch using the results of the monitoring by memory monitoring module 213. In some implementations, risk assessment value determiner 214 can determine the risk assessment value for the run-time patch based on the number of accesses of the monitored memory space. For example, responsive to determining that the number of accesses of the monitored portion of the memory space satisfies a threshold condition, risk assessment value determiner 214 can set the risk assessment value to indicate a high risk associated with deploying the run-time patch. Similarly, responsive to determining that the number of accesses of the monitored portion of the memory space does not satisfy the threshold condition, risk assessment value determiner 214 can set the risk assessment value to indicate a low risk associated with deploying the run-time patch.

Additionally, risk assessment value determiner 214 can use time as a factor in determining the risk assessment value. As noted above, the monitoring process may be conducted for particular periods of time. Should there be no accesses of the monitored memory during the time period, or the number of accesses is beneath a low threshold value for that particular time period (e.g., the number of accesses does not satisfy a threshold condition), the associated run-time patch may be deemed low risk. Conversely, if the number of accesses exceeds a high threshold value for that time period (e.g., the number of accesses satisfies the threshold condition), the associated run-time patch may be deemed high risk.

Once a risk assessment has been made for the memory associated with the run-time patch, test process execution module 215 may be invoked. Test process execution module 215 is responsible for generating and/or executing a battery of testing (e.g., a testing process, testing protocol, etc.) for the run-time patch. In some implementations, this can include selecting a number of test cases to execute, selecting a set of test routines to execute that are associated with the executable program updated by the run-time patch, selecting a set of test routines to execute that access data structures and/or registers affected by the run-time patch, or the like. Additionally, this may include identifying and notifying interested parties associated with the run-time patch. For example, sending a notification to a list of software deployment approvers within an organization associated with the run-time patch (e.g., sending an email or text message to a lead developer or approving manager).

Responsive to determining that the risk assessment value indicates a high risk associated with deploying the run-time patch, test process execution module 215 can execute a high risk testing process for the run-time patch. For example, test process execution module 215 can increase the amount of testing for the run-time patch to complete a testing stage of a software deployment process. Conversely, responsive to determining that the risk assessment value indicates a low risk associated with deploying the run-time patch, test process execution module 215 can execute a low risk testing process for the run-time patch. For example, test process execution module 215 can decrease the amount of testing for the run-time patch to complete a testing stage of a software deployment process.

Figure 3:
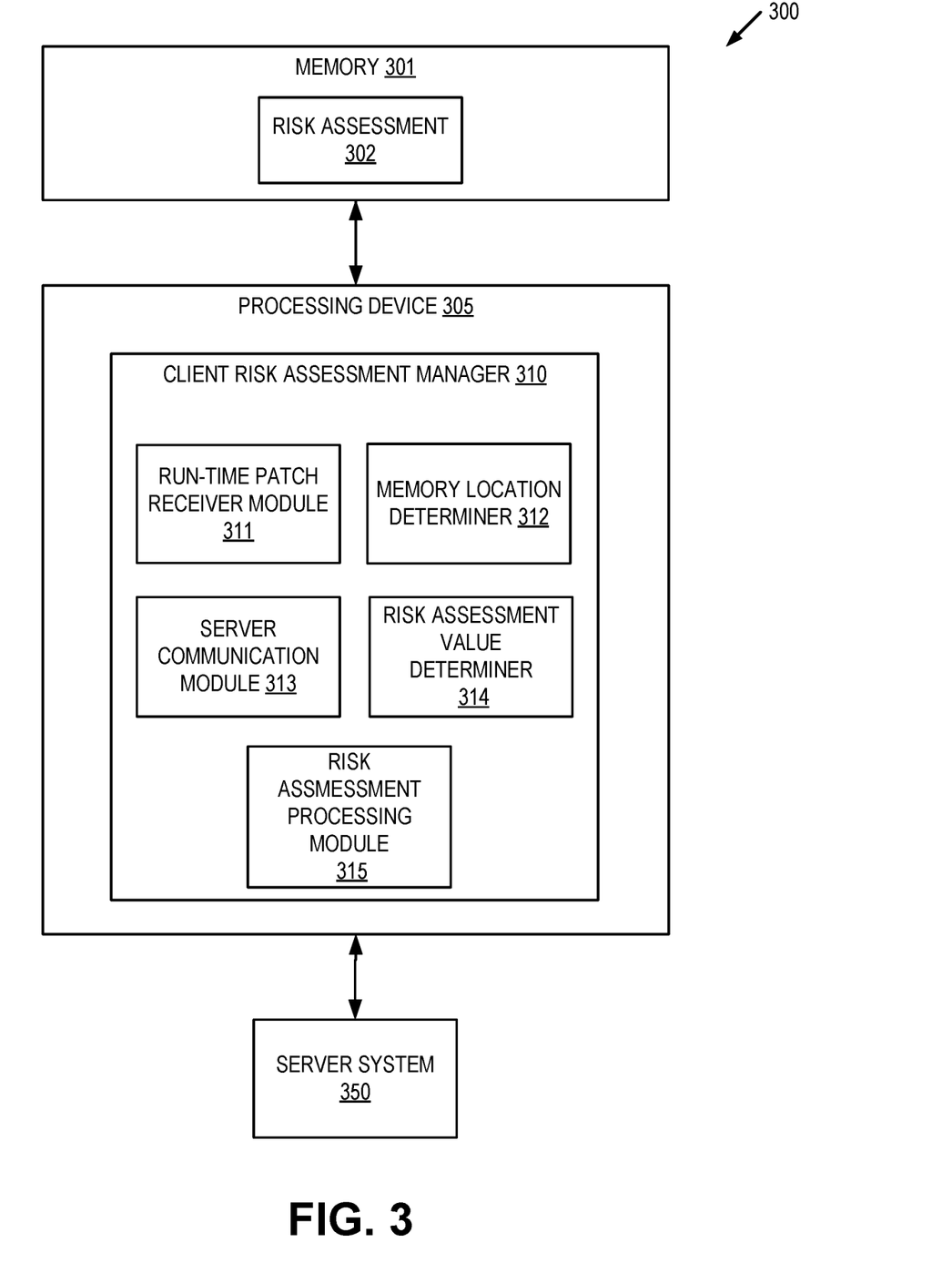
FIG. 3 depicts a block diagram illustrating an example of a client risk assessment manager that communicates with a server system, in accordance with one or more aspects of the present disclosure.

FIG. 3 depicts a block diagram illustrating an example of a client risk assessment manager 310 that communicates with a server system 350 for facilitating risk assessment of run-time patches. In some implementations, client risk assessment manager 310 may correspond to client risk assessment manager 135 of FIG. 1. As shown in FIG. 3, client risk assessment manager 310 may be a component of a computing apparatus 300 that includes a processing device 305, operatively coupled to a memory 301, to execute client risk assessment manager 310. In some implementations, processing device 305 and memory 301 may correspond to processing device 502 and main memory 504 respectively as described below with respect to FIG. 8.

Client risk assessment manager 310 may include run-time patch receiver module 311, memory location determiner 312, server communication module 313, risk assessment value determiner 314, and risk assessment processing module 315. Alternatively, the functionality of one or more of run-time patch receiver module 311, memory location determiner 312, server communication module 313, risk assessment value determiner 314, and risk assessment processing module 315 may be combined into a single module or divided into multiple sub-modules. In some implementations, client risk assessment manager 310 may be a component of an integrated development environment (IDE) or software debugging application that executes on a client device or system (e.g., client system 130 of FIG. 1).

Run-time patch receiver module 311 is responsible for receiving a run-time patch to update one or more portions of a memory space. For example, the run-time patch can include updates to executable instructions, in-memory data structures, register values, memory heap data, memory stack data, or the like. Run-time patch receiver module 311 can receive the patch from an external system (e.g., a connected vendor system), from a component that generates the patch within the client system, from an IDE or debugging application on the client system, or from any similar source.

Memory location determiner 312 is responsible for analyzing the run-time patch and determining the portions of the memory space updated by the run-time patch. The run-time patch may include a list of memory locations updated by the patch in associated metadata. Memory location determiner 312 can analyze this associated data and determine the memory locations that are to be updated by the patch. For example, memory location determiner 312 can determine the address associated with an executable instruction to be updated, the address associated with a data structure to be updated, an address associated with a register value to be updated, or the like. Once the particular memory locations that are to be updated by the patch have been identified, client risk assessment manager 310 can send a request to server system 350 to begin monitoring one or more of those memory locations to determine the risk of implementing the run-time patch.

Server communication module 313 is responsible for sending, to server system 350, a request to protect one or more of the identified portions of memory that are to be updated by the run-time patch in order to determine when those portions of memory are accessed. In some implementations, server communication module 313 can send the request to server system 350 that specifically identifies a method of protecting the identified portions of memory. Alternatively, server communication module 313 may simply send a request that the identified portions of memory should be monitored and allow the server 350 to determine the method of doing so. The actions of server system 350 in response to this request are described below with respect to FIG. 4.

In an illustrative example, client risk assessment manager 310 may be a component of a debugging application executing on the client system. In such cases, server communication module 313 may send a request to the server system 350 to utilize the breakpoint/debugging method of protecting the memory locations and send with the request the particular memory locations to be protected using the breakpoint/debugging registers of the server system. Server communication module 313 may subsequently receive from the server system 350 an indication that the identified memory locations have been protected and are being monitored. For example, server communication module 313 may receive from server system 350 an acknowledgment of the request with a status code, a specific notification that the memory is being monitored, or the like. Subsequently, server communication module 313 may receive a response from server system 350 that includes the total number of accesses of the protected memory space.

As noted above, in some cases, the memory may be protected and monitored for a particular period of time. Server communication module 313 may send a time period with the initial request. For example, when server communication module 313 sends the request to server 350 to protect and monitor the memory associated with run-time patch, the request can include information that controls the duration of the monitoring. For example, the request can include a specific start time and a specific end time, a specific start time and duration, or the like. Once the time period has ended, server communication module 313 may receive a response with the total number of accesses of the protected memory that occurred during that time. Similarly, the request can include a start time with a threshold number of accesses to track. Once the server detects that the threshold number has been reached, server communication module 313 may receive a response that includes the elapsed time to reach the threshold number. This information received from server 350 can be stored in memory 301 for use by risk assessment value determiner 314.

In some implementations, client risk assessment manager 310 may also drive the process of determining the number of accesses of the protected memory space by submitting additional requests to the server system 350 to execute the program affected by the run-time patch. In such cases, client risk manager 310 may receive information from the user interface of the debugging application or IDE that specifies a number of times to execute the program. Server communication module 313 may then send a request to server system 350 with the number of times to execute the program. Alternatively, server communication module 313 may send individual requests to server system 350 (one request for each time the program is to be executed). Server communication module 313 can subsequently receive one or more responses from the server system 350 with the number of accesses of the protected memory that were caused by the requests to execute the program. This information can be stored in memory 301 for use by risk assessment value determiner 314.

Risk assessment value determiner 314 is responsible for determining the risk associated with the run-time patch using the results of the memory monitoring collected by and received from server 350. In some implementations, risk assessment value determiner 314 can determine the risk assessment value for the run-time patch based on the number of accesses of the monitored memory space. For example, responsive to determining that the number of accesses of the monitored portion of the memory space satisfies a threshold condition, risk assessment value determiner 314 can set the risk assessment value to indicate a high risk associated with deploying the run-time patch. Similarly, responsive to determining that the number of accesses of the monitored portion of the memory space does not satisfy the threshold condition, risk assessment value determiner 314 can set the risk assessment value to indicate a low risk associated with deploying the run-time patch. The risk assessment value can be stored in memory 301 (e.g., risk assessment 302) for use by risk assessment processing module 315.

As noted above, in some implementations, client risk assessment manager 310 may receive the number of accesses of the protected memory that were caused by specific requests to execute a program affected by the run-time patch. In such cases, risk assessment value determiner 314 may use this information when determining risk. For example, risk assessment value determiner 314 may determine a percentage of the requests that caused the protected portion of memory to be accessed based on the total number of accesses received from server 350. Responsive to determining that the percentage satisfies a threshold percentage condition, risk assessment value determiner 314 can set the risk assessment value to indicate a high risk associated with deploying the run-time patch. Conversely, responsive to determining that the percentage does not meet the threshold percentage value, risk assessment value determiner 314 can set the risk assessment value to indicate a high risk associated with deploying the run-time patch. The risk assessment value can be stored in memory 301 (e.g., risk assessment 302) for use by risk assessment processing module 315.

Once a risk assessment has been made for the memory associated with the run-time patch, risk assessment processing module 315 may be invoked. Risk assessment processing module 315 is responsible for providing the risk assessment value to the client system for use with deployment of the run-time patch. In some implementations, risk assessment processing module 315 may provide the risk assessment value to a user interface of the client device (e.g., the IDE or debugging application) for display. In some implementations, risk assessment processing module 315 can additionally configure and/or execute a testing process for deploying the run-time patch. This can include selecting a number of test cases to execute, selecting a set of test routines to execute that are associated with the executable program updated by the run-time patch, selecting a set of test routines to execute that access data structures and/or registers affected by the run-time patch, or the like. Additionally, this may include identifying and notifying interested parties associated with the run-time patch. For example, sending a notification to a list of software deployment approvers within an organization associated with the run-time patch (e.g., sending an email or text message to a lead developer or approving manager).

Figure 4:
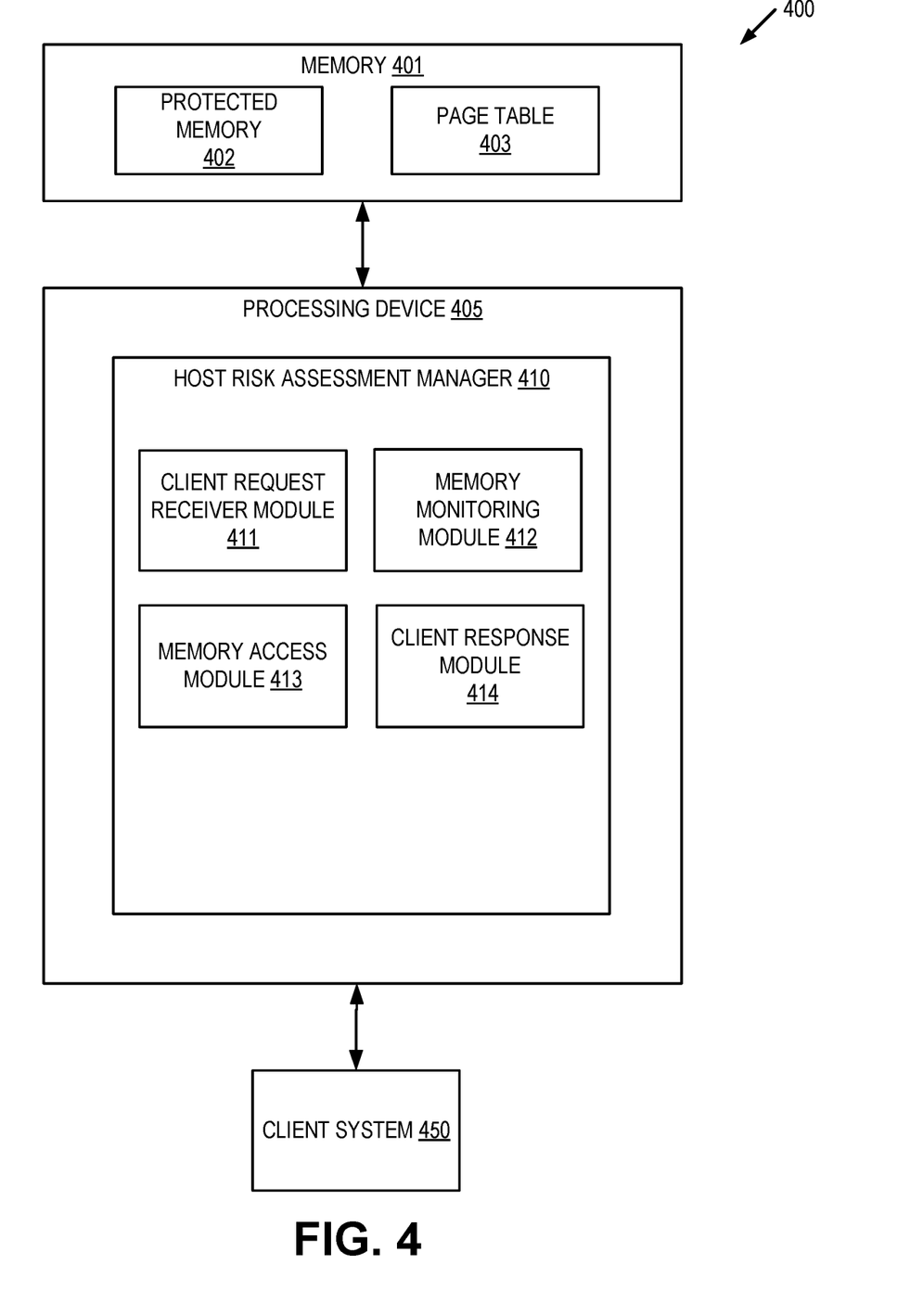
FIG. 4 depicts a block diagram illustrating an example of a host risk assessment manager that communicates with a client system, in accordance with one or more aspects of the present disclosure.

FIG. 4 depicts a block diagram illustrating an example of a host risk assessment manager 405 that communicates with a client system 450 for facilitating risk assessment of run-time patches. In some implementations, host risk assessment manager 410 may correspond to host risk assessment manager 115 of FIG. 1. As shown in FIG. 2, host risk assessment manager 410 may be a component of a computing apparatus 400 that includes a processing device 405, operatively coupled to a memory 401, to execute host risk assessment manager 410. In some implementations, processing device 405 and memory 401 may correspond to processing device 502 and main memory 504 respectively as described below with respect to FIG. 8.

Host risk assessment manager 410 may include client request receiver module 411, memory monitoring module 412, memory access module 413, and client response module 414. Alternatively, the functionality of one or more of client request receiver module 411, memory monitoring module 412, memory access module 413, and client response module 414 may be combined into a single module or divided into multiple sub-modules.

Client request receiver module 411 is responsible for receiving and processing requests from client system 450 to protect and monitor memory (e.g., protected memory 402). The requests sent by client system 450 are described above with respect to FIG. 3. As noted above, the request may include the location of memory to protect, a duration of time to monitor the memory, the type of protection method to use, etc. In an illustrative example, request receiver module 411 may receive, from client system 450, a request to protect a portion of memory space that includes an executable instruction of a program.

Memory monitoring module 412 is responsible for protecting and monitoring the memory locations included in the request (e.g., protected memory 402). Memory monitoring module 412 may protect and monitor protected memory 402 using any of the methods described above with respect to memory monitoring module 213 of FIG. 2. For example, memory monitoring module 412 may utilize page table entries (e.g., in page table 403), breakpoint/debugging registers, instruction patches, etc. Once the memory monitoring has completed (e.g., the time period for monitoring has ended, a threshold number of accesses has been reached, etc.) memory access module 413 may be invoked.

Memory access module 413 is responsible for determining a total number of accesses of the protected portion of memory during the monitoring process. Using the executable instruction example, memory monitoring module 213 can determine the total number of times that the protected area of memory that includes the monitored instruction (e.g., the instruction affected by the run-time patch) has been accessed by executions of that program. Once this information has been determined, client response module 414 may be invoked.

Client response module 414 is responsible for sending a response to client system 450 with information detailing the accesses of the protected memory being monitored (e.g., protected memory 402). For example, client response module 414 can send a response to client system 450 with the total number of accesses of the memory space during the monitoring time period. Similarly, for instances where client system sends one or more requests to execute a program to monitor the accesses of an instruction within that program, client response module 414 can send a response that includes the total number of accesses that were caused by the requests to execute the program.

Figure 5:
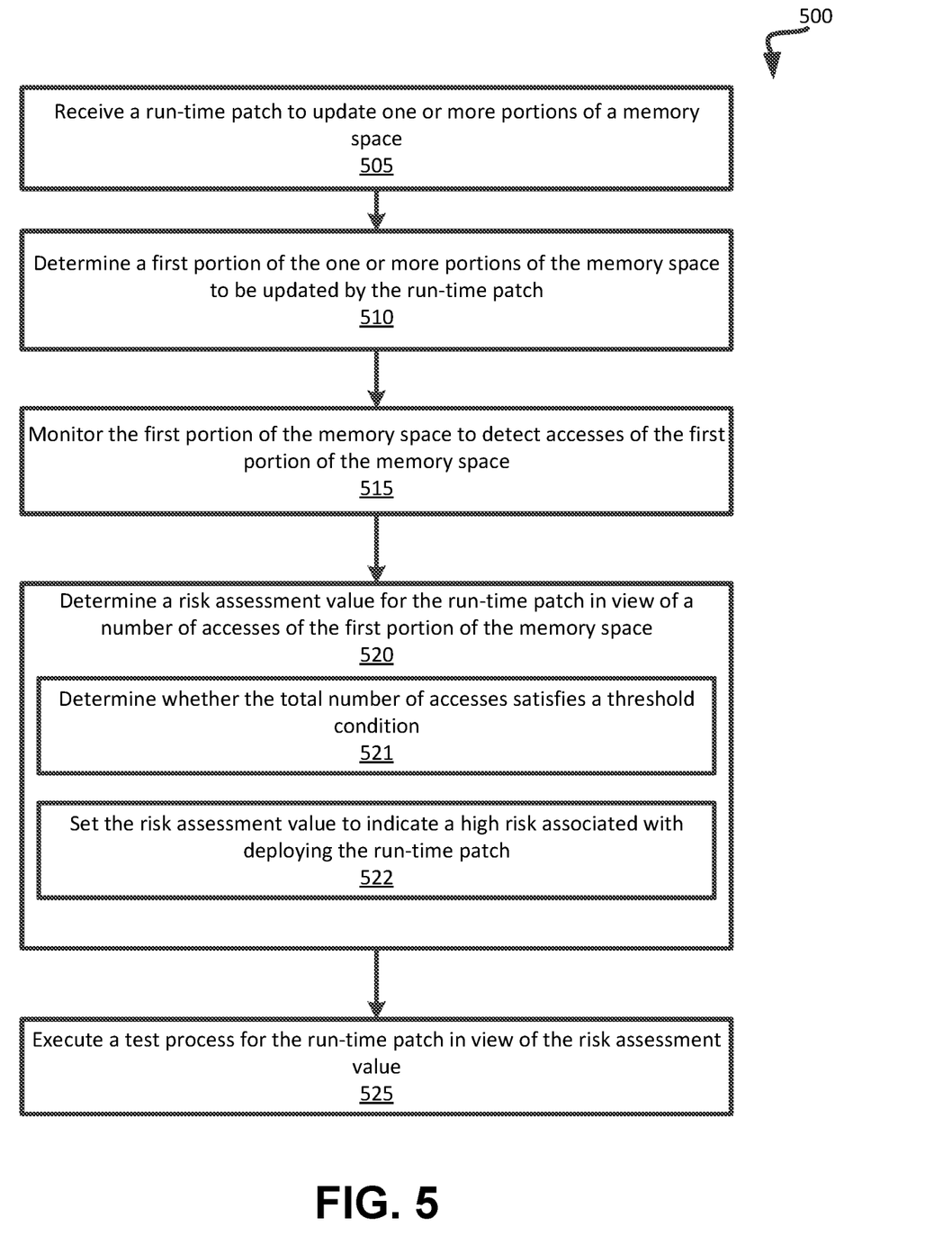
FIG. 5 depicts a flow diagram of a method for risk assessment of a run-time patch by a server system, in accordance with one or more aspects of the present disclosure.

FIG. 5 depicts a flow diagram of an example method 500 for risk assessment of a run-time patch by a server system. The method may be performed by processing logic that may comprise hardware (circuitry, dedicated logic, etc.), computer readable instructions (run on a general purpose computer system or a dedicated machine), or a combination of both. In an illustrative example, method 500 may be performed by host risk assessment manager 115 in FIG. 1, or host risk assessment manager 210 in FIG. 2. Alternatively, some or all of method 500 might be performed by another module or machine. It should be noted that blocks depicted in FIG. 5 could be performed simultaneously or in a different order than that depicted.

At block 505, processing logic receives a run-time patch to update one or more portions of a memory space. At block 510, processing logic determines a first portion of memory of the one or more portions of the memory space to be updated by the run-time patch. At block 515, processing logic monitors the first portion of the memory space to detect accesses of the first portion of memory. At block 520, processing logic determines a risk assessment value for the run-time patch in view of a number of accesses of the first portion of the memory space. In some implementations, processing logic can make this determination by invoking blocks 521-522.

At block 521, processing logic determines whether the total number of accesses satisfies a threshold condition. At block 522, responsive to determining that the total number of accesses satisfies the threshold, processing logic sets the risk assessment value to indicate a high risk associated with deploying the run-time patch. At block 525, processing logic executes a test process for the run-time patch in view of the risk assessment value determined at block 520. After block 525, the method of FIG. 5 terminates.

Figure 6:
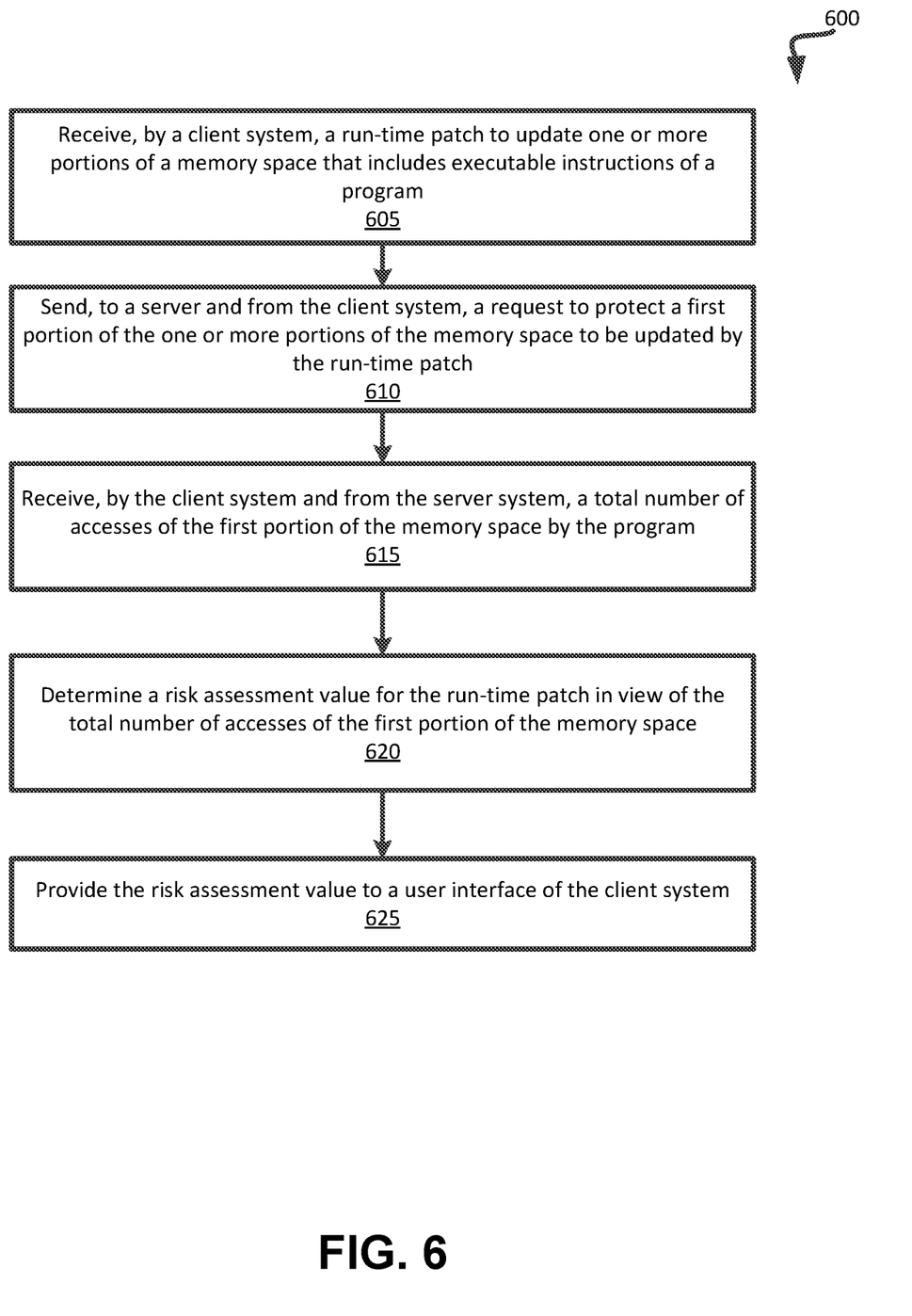
FIG. 6 depicts a flow diagram of a method for risk assessment of a run-time patch by a client system that communicates with a server system, in accordance with one or more aspects of the present disclosure.

FIG. 6 depicts a flow diagram of an example method 600 for risk assessment of a run-time patch by a client system that communicates with a server system. The method may be performed by processing logic that may comprise hardware (circuitry, dedicated logic, etc.), computer readable instructions (run on a general purpose computer system or a dedicated machine), or a combination of both. In an illustrative example, method 600 may be performed by client risk assessment manager 135 in FIG. 1, or client risk assessment manager 310 in FIG. 3. Alternatively, some or all of method 600 might be performed by another module or machine. It should be noted that blocks depicted in FIG. 6 could be performed simultaneously or in a different order than that depicted.

At block 605, processing logic receives, by a client system, a run-time patch to update one or more portions of a memory space that comprises executable instructions of a program. At block 610, processing logic sends, to a server and from the client system, a request to protect a first portion of the one or more portions of the memory space to be updated by the run-time patch. At block 615, processing logic receives, by the client system and from the server system, a total number of accesses of the first portion of the memory space by the program. At block 620, processing logic determines a risk assessment value for the run-time patch in view of the total number of accesses of the first portion of the memory space. At block 625, processing logic provides the risk assessment value to a user interface of the client system. After block 625, the method of FIG. 6 terminates.

Figure 7:
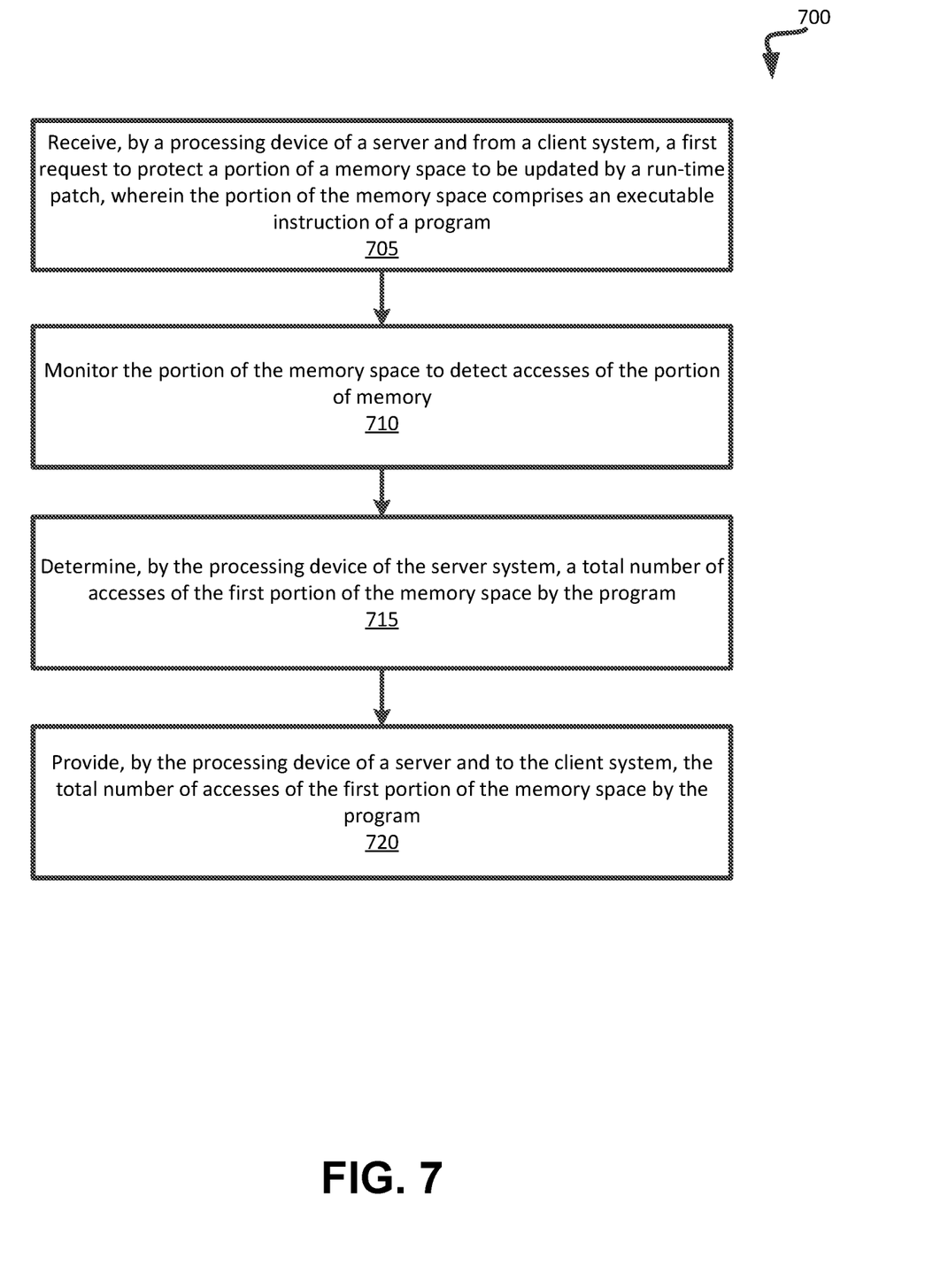
FIG. 7 depicts a flow diagram of a method for risk assessment of a run-time patch by a server system that communicates with a client system, in accordance with one or more aspects of the present disclosure.

FIG. 7 depicts a flow diagram of an example method 700 for risk assessment of a run-time patch by a server system that communicates with a client system. The method may be performed by processing logic that may comprise hardware (circuitry, dedicated logic, etc.), computer readable instructions (run on a general purpose computer system or a dedicated machine), or a combination of both. In an illustrative example, method 700 may be performed by host risk assessment manager 115 in FIG. 1, or host risk assessment manager 410 in FIG. 4. Alternatively, some or all of method 700 might be performed by another module or machine. It should be noted that blocks depicted in FIG. 7 could be performed simultaneously or in a different order than that depicted.

At block 705, processing logic receives, by a server and from a client system, a first request to protect a portion of a memory space to be updated by a run-time patch, wherein the portion of the memory space comprises an executable instruction of a program. At block 710, processing logic monitors the portion of the memory space to detect accesses of the portion of memory. At block 715, processing logic determines, by the server system, a total number of accesses of the first portion of the memory space by the program. At block 720, processing logic provides, by the server and to the client system, the total number of accesses of the first portion of the memory space by the program. After block 720, the method of FIG. 7 terminates.

Figure 8:
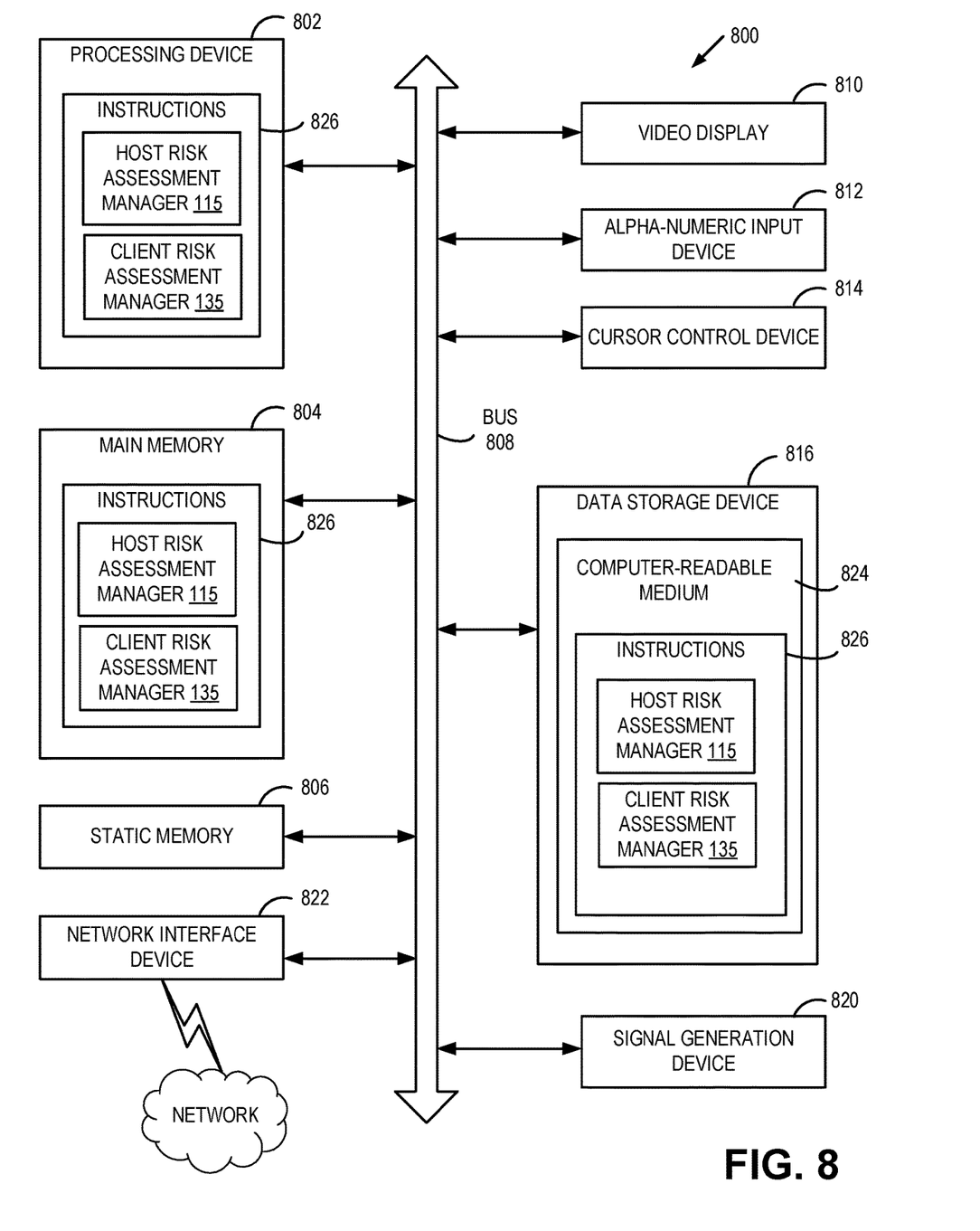
FIG. 8 depicts a block diagram of an illustrative computer system operating in accordance with one or more aspects of the present disclosure.

FIG. 8 depicts an example computer system 800 which can perform any one or more of the methods described herein. In one example, computer system 800 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic (e.g., instructions 826) that includes host risk assessment manager 115 and/or client risk assessment manager 135 for performing the operations and steps discussed herein (e.g., corresponding to the methods of FIGS. 5-7, etc.).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a non-transitory computer-readable medium 824 on which may store instructions 826 that include host risk assessment manager 115 and/or client risk assessment manager 135 (e.g., corresponding to the methods of FIGS. 5-7, etc.) embodying any one or more of the methodologies or functions described herein. Host risk assessment manager 115 and/or client risk assessment manager 135 may also reside, completely or at least partially, within the main memory 804 and/or within the processing device 802 during execution thereof by the computer system 800, the main memory 804 and the processing device 802 also constituting computer-readable media. Host risk assessment manager 115 and/or client risk assessment manager 135 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "sending," "receiving," "determining," "monitoring," "executing," "monitoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
receiving, by a processing device, a run-time patch to update one or more portions of a memory space;
determining, by the processing device, a first portion of the memory space of the one or more portions of the memory space to be updated by the run-time patch;
determining, by the processing device, an address of a memory page associated with the first portion of the memory space;
identifying, by the processing device, an entry in a memory page table associated with the address of the memory page;
modifying, by the processing device, the entry in the memory page table to obtain a protected memory page;
monitoring, by the processing device, the memory page to detect accesses of the first portion of the memory space;
determining that a number of accesses of the first portion of the memory space satisfies a threshold condition; and
responsive to determining that the number of accesses satisfies the threshold condition, executing, by the processing device, a risk testing process for the run-time patch.

2. The method of claim 1, further comprising:
detecting, by the processing device, a page fault generated by an access to the protected memory page;
increasing, by the processing device, the number of accesses of the first portion of the memory space in view of the page fault; and
storing, by the processing device, information associated with the page fault in a data store.

3. The method of claim 1, wherein the one or more portions of the memory space each comprise at least one of an address associated with an executable instruction, an address associated with a data structure, or an address associated with a register value.

4. The method of claim 1, wherein executing the risk testing process comprises:
increasing an amount of testing for the run-time patch to complete a testing stage of a software deployment process.

5. A system comprising:
a memory; and
a processing device, operatively coupled with the memory, to:
receive a run-time patch to update one or more portions of a memory space;
determine a first portion of the memory space of the one or more portions of the memory space to be updated by the run-time patch;
identify a register for debugging an executing program;
configure the register to halt execution of a program responsive to the program accessing the first portion of the memory space, thereby obtaining a configured register;
monitor the first portion of the memory space to detect accesses of the first portion of the memory space;
determine a risk assessment value for the run-time patch in view of a number of accesses of the first portion of the memory space; and
execute a test process for the run-time patch in view of the risk assessment value.

6. The system of claim 5, wherein the processing device is further to:
detect an access by the program of the first portion of the memory space in view of the configured register;
increase the number of accesses of the first portion of the memory space in view of the detected access;
store information associated with the detected access in a data store; and
resume execution of the program.

7. The system of claim 5, wherein to determine the risk assessment value for the run-time patch, the processing device is further to:
responsive to determining that the number of accesses of the first portion of the memory space satisfies a threshold condition, set the risk assessment value to indicate a high risk associated with deploying the run-time patch; and responsive to determining that the number of accesses of the first portion of the memory space does not satisfy the threshold condition, set the risk assessment value to indicate a low risk associated with deploying the run-time patch.

8. The system of claim 5, wherein to execute a test process for the run-time patch in view of the risk assessment value, the processing device is further to:
responsive to determining that the risk assessment value indicates a high risk associated with deploying the run-time patch, execute a high risk testing process for the run-time patch; and
responsive to determining that the risk assessment value indicates a low risk associated with deploying the run-time patch, execute a low risk testing process for the run-time patch.

9. A non-transitory computer readable medium comprising instructions, which when accessed by a processing device, cause the processing device to:
receive, by a client system, a run-time patch to update one or more portions of a memory space that comprises executable instructions of a program;
send, to a server and from the client system, a request to protect a first portion of the one or more portions of the memory space to be updated by the run-time patch;
receive, by the client system and from the server, a total number of accesses of the first portion of the memory space by the program;
determine a risk assessment value for the run-time patch in view of the total number of accesses of the first portion of the memory space; and
provide the risk assessment value to a user interface of the client system.

10. The non-transitory computer readable medium of claim 9, wherein to determine the risk assessment value, the processing device is further to:
responsive to determining that the total number of accesses of the first portion of the memory space satisfies a threshold condition, set the risk assessment value to indicate a high risk associated with deploying the run-time patch; and
responsive to determining that the total number of accesses of the first portion of the memory space does not satisfy the threshold condition, set the risk assessment value to indicate a low risk associated with deploying the run-time patch.

11. The non-transitory computer readable medium of claim 9, wherein the processing device is further to:
receive, from the server by the client system, an indication that the first portion of the memory space has been protected;
send, to the server and from the client system, one or more additional requests to the server to execute the program; and
determine a percentage of the one or more additional requests that cause the first portion of memory to be accessed in view of the total number of accesses.

12. The non-transitory computer readable medium of claim 11, wherein the processing device is further to:
responsive to determining that the percentage satisfies a threshold condition, set the risk assessment value to indicate a high risk associated with deploying the run-time patch; and
responsive to determining that the percentage does not satisfy the threshold condition, set the risk assessment value to indicate a low risk associated with deploying the run-time patch.

13. The non-transitory computer readable medium of claim 9, wherein the processing device is further to:
configure a testing protocol for the program in view of the risk assessment; and
deploy the testing protocol for the program.

14. The non-transitory computer readable medium of claim 13, wherein the testing protocol comprises an amount of testing for run-time patch to complete a testing stage of a software deployment process.

15. A method comprising:
receiving, by a processing device of a server and from a client system, a first request to protect a portion of a memory space to be updated by a run-time patch, wherein the portion of the memory space comprises an executable instruction of a program;
monitoring the portion of the memory space to detect accesses of the portion of the memory space;
determining, by the processing device of the server, a total number of accesses of the portion of the memory space by the program; and
providing, by the processing device of the server and to the client system, the total number of accesses of the portion of the memory space by the program.

16. The method of claim 15, wherein monitoring the portion of the memory space comprises:
determining an address of a memory page associated with the portion of the memory space;
identifying an entry in a memory page table associated with the address of the memory page; and
modifying the entry in the memory page table to protect the memory page associated with the portion of the memory space.

17. The method of claim 16, further comprising:
detecting, by the processing device, a page fault generated by an access to the protected memory page;
increasing, by the processing device, the number of accesses of the portion of the memory space in view of the page fault; and
storing, by the processing device, information associated with the page fault in a data store.

18. The method of claim 15, wherein monitoring the portion of the memory space comprises:
identifying a register for debugging the program;
determining that a program is accessing the portion of the memory space; and
configuring the register to obtain a configured register and halt execution of the program responsive to determining that the program is accessing the portion of the memory space.

19. The method of claim 18, further comprising:
detecting, by the processing device, an access by the program of the portion of the memory space in view of the configured register;
increasing, by the processing device, the number of accesses of the portion of the memory space in view of the detected access;
storing, by the processing device, information associated with the detected access in a data store; and
resuming, by the processing device, execution of the program.

* * * * *